(12) United States Patent
Kawanabe et al.

(10) Patent No.: US 7,211,627 B2
(45) Date of Patent: May 1, 2007

(54) ELASTOMER COMPOSITION AND PRESSURE-SENSITIVE ADHESIVE COMPOSITIONS

(75) Inventors: Takeshi Kawanabe, Kanagawa (JP); Sadaharu Hashimoto, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/544,645

(22) PCT Filed: Feb. 26, 2004

(86) PCT No.: PCT/JP2004/002262

§ 371 (c)(1),
(2), (4) Date: Jun. 7, 2006

(87) PCT Pub. No.: WO2004/076556

PCT Pub. Date: Sep. 10, 2004

(65) Prior Publication Data

US 2006/0235165 A1    Oct. 19, 2006

(30) Foreign Application Priority Data

Feb. 28, 2003 (JP) .............................. 2003-052170

(51) Int. Cl.
  *C08L 53/02* (2006.01)
(52) U.S. Cl. .................... 525/99; 525/86; 524/505; 156/334
(58) Field of Classification Search .................. 525/86, 525/99; 524/505; 156/334
  See application file for complete search history.

(56) References Cited

U.S. PATENT DOCUMENTS 5,869,562 A    2/1999  Lindquist et al.
5,891,957 A    4/1999  Hansen et al.
6,630,536 B2 * 10/2003  Kuniya et al. ................ 525/95

FOREIGN PATENT DOCUMENTS

| JP | 60-223880 A | 11/1985 |
| JP | 60-226578 A | 11/1985 |
| JP | 60-226579 A | 11/1985 |
| WO | WO-96/11236 A1 | 4/1996 |

* cited by examiner

*Primary Examiner*—Fred Teskin
(74) *Attorney, Agent, or Firm*—Birch, Stewart, Kolasch & Birch, LLP

(57) ABSTRACT

The invention provides an elastomer composition including an aromatic vinyl-isoprene block copolymer (a) having two or more poly(aromatic vinyl) blocks, in an amount more than 10 wt. % and less than 47.5 wt. %; an aromatic vinyl-isoprene diblock copolymer (b) in an amount more than 47.5 wt. % and less than 85 wt. %; and polyisoprene (c) having a weight average molecular weight of 20,000 to 100,000, in an amount more than 5 wt. % and less than 20 wt. %, wherein the composition has an aromatic vinyl monomer unit content more than 14 wt. % and less than 50 wt. %, based on the total amount of the components (a), (b), and (c).

The elastomer composition is suitable for providing the pressure-sensitive adhesive composition, which exhibits excellent initial bond strength, peel strength, and holding power, and, even at relatively low temperature, exhibits minimal drop in initial bond strength and peel strength.

13 Claims, No Drawings

US 7,211,627 B2

ELASTOMER COMPOSITION AND PRESSURE-SENSITIVE ADHESIVE COMPOSITIONS

TECHNICAL FIELD

The present invention relates to an elastomer composition and to a pressure-sensitive adhesive composition. More particularly, the invention relates to a pressure-sensitive adhesive composition which exhibits excellent initial bond strength, peel strength, and holding power, and, even at relatively low temperature, exhibits minimal drop in bond strength and peel strength, and to an elastomer composition suitable for providing the pressure-sensitive adhesive composition.

BACKGROUND ART

Pressure-sensitive adhesive tapes such as packing tapes and surface-protective tapes and pressure-sensitive adhesive labels, seals, and sheets, etc. for industrial and office use are produced by applying a pressure-sensitive adhesive composition predominantly containing an elastomer and a tackifier resin onto a backing support such as polyethylene film, polyester cloth, or kraft paper.

In recent years, use of a hot-melt and solvent-free pressure-sensitive adhesive composition has been recommended, from the viewpoint of environmental regulations, conservation of energy and resources, and other issues. In this connection, a styrene-isoprene-styrene block copolymer has been widely employed as the elastomer used in such a pressure-sensitive adhesive composition.

Pressure-sensitive adhesive compositions are required to have excellent adhesion performance such as initial bond strength, peel strength, and holding power. In addition, demand also exists for a pressure-sensitive adhesive composition which, even at relatively low temperature (e.g., at a cold place or in a refrigerator), exhibits minimal drop in initial bond strength and peel strength.

With the aim of attaining such performance of the pressure-sensitive adhesive composition, there is disclosed a pressure-sensitive adhesive composition containing a styrene-isoprene-styrene block copolymer and a styrene-isoprene diblock copolymer (see Japanese Patent Application Laid-Open (kokai) Nos. 63-178187 and 63-178188 and Japanese kohyo Patent Publication No. 2001-504519). In addition, a pressure-sensitive adhesive composition containing a styrene-isoprene-styrene block copolymer and a styrene-butadiene block copolymer has also been proposed (see U.S. Pat. No. 5,290,842).

However, the aforementioned pressure-sensitive adhesive compositions have drawbacks that excellent peel strength at ambient temperature drastically drops at low temperature and that holding power is poor.

DISCLOSURE OF THE INVENTION

In view of the foregoing, an object of the present invention is to provide a pressure-sensitive adhesive composition which exhibits excellent initial bond strength, peel strength, and holding power, and, even at relatively low temperature, exhibits minimal drop in initial bond strength and peel strength. Another object of the invention is to provide an elastomer composition suitable for providing the pressure-sensitive adhesive composition.

The present inventors have carried out extensive studies, and have found that the aforementioned objects can be attained through employment of an elastomer composition which contains, in specific proportions, an aromatic vinyl-isoprene block copolymer (a) having two or more poly(aromatic vinyl) blocks, an aromatic vinyl-isoprene diblock copolymer (b), and polyisoprene having a specific weight average molecular weight (c), and which has an aromatic vinyl monomer unit content falling within a specific range. The present invention has been accomplished on the basis of this finding.

Accordingly, a first invention provides an elastomer composition comprising an aromatic vinyl-isoprene block copolymer (a) having two or more poly(aromatic vinyl) blocks, in an amount more than 10 wt. % and less than 47.5 wt. %;

an aromatic vinyl-isoprene diblock copolymer (b) in an amount more than 47.5 wt. % and less than 85 wt. %; and polyisoprene (c) having a weight average molecular weight of 20,000 to 100,000, in an amount more than 5 wt. % and less than 20 wt. %, wherein the composition has an aromatic vinyl monomer unit content more than 14 wt. % and less than 50 wt. %, based on the total amount of the components (a), (b), and (c).

A second invention provides a pressure-sensitive adhesive composition comprising the elastomer composition and a tackifier resin.

Thus, the present invention provides a pressure-sensitive adhesive composition which exhibits excellent initial bond strength, peel strength, and holding power, and, even at relatively low temperature, exhibits minimal drop in initial bond strength and peel strength, and an elastomer composition suitable for providing the pressure-sensitive adhesive composition.

BEST MODES FOR CARRYING OUT THE INVENTION

[Elastomer Composition]

The aromatic vinyl-isoprene block copolymer (a) (hereinafter maybe referred to simply as component (a)) which is used in the elastomer composition of the present invention has two or more poly(aromatic vinyl) blocks. Among such block copolymers, an aromatic vinyl-isoprene block copolymer having two poly(aromatic vinyl) blocks; i.e., a poly(aromatic vinyl)-polyisoprene-poly(aromatic vinyl) triblock copolymer is preferably employed as component (a).

Examples of aromatic vinyl monomers for producing a poly(aromatic vinyl) block contained in component (a) include styrene, α-methylstyrene, vinyltoluene, and vinylnaphthalene. Of these, styrene is preferably used.

The poly(aromatic vinyl) block contained in component (a) may be a copolymer of an aromatic vinyl monomer and a monomer which can copolymerize with the aromatic vinyl monomer, so long as the effect of the present invention is not virtually impaired. The poly(aromatic vinyl) block preferably contains an aromatic vinyl monomer unit in an amount of 75 wt. % or more, more preferably 90 wt. % or more, particularly preferably 100%. When the aromatic vinyl monomer unit content of the poly(aromatic vinyl) block is excessively small, the produced pressure-sensitive adhesive composition tends to exhibit poor holding power.

Examples of monomers which can copolymerize with the aromatic vinyl monomer include isoprene and 1,3-butadiene.

Each of the poly(aromatic vinyl) blocks contained in component (a) preferably has a weight average molecular weight of 5,000 to 100,000, more preferably 10,000 to 80,000, particularly preferably 15,000 to 70,000. When the weight average molecular weight is excessively small, the pressure-sensitive adhesive composition may exhibit poor holding power, whereas when the weight average molecular weight is excessively large, melt viscosity of the elastomer composition and that of the pressure-sensitive adhesive composition tend to increase, making the handling thereof difficult.

Each of the poly(aromatic vinyl) blocks contained in component (a) preferably has a ratio (Mw/Mn) of weight average molecular weight (Mw) to number average molecular weight (Mn) of 2 or less, more preferably 1.5 or less. A small value of the ratio results in production of a pressure-sensitive adhesive composition exhibiting excellent holding power.

The polyisoprene block contained in component (a) may be a copolymer of isoprene and a monomer which can copolymerize with isoprene, so long as the effect of the present invention is not virtually impaired. The polyisoprene block preferably contains an isoprene unit in an amount of 80 wt. % or more, more preferably 100%. When the isoprene unit content of the polyisoprene block is excessively small, the produced pressure-sensitive adhesive composition tends to exhibit a poor initial bond strength at low temperature.

Examples of preferred monomers which can polymerize with isoprene include the aforementioned aromatic vinyl monomers and conjugated diene monomers other than isoprene such as 1,3-butadiene, 2,3-dimethyl-1,3-butadiene, and 1,3-pentadiene.

The aromatic vinyl monomer unit content of component (a) is generally 15 to 75 wt. %, preferably 17 to 50 wt. %, more preferably 18 to 40 wt. %.

No particular limitation is imposed on the vinyl bond content of the isoprene units contained in component (a), and the vinyl bond content is generally 50 wt. % or less, preferably 20 wt. % or less, more preferably 5 to 10 wt. %. When the content falls with in the above range, a pressure-sensitive adhesive composition exhibiting an excellent initial bond strength at low temperature can be produced.

Component (a) preferably has a weight average molecular weight of 120,000 to 1,200,000, more preferably 140,000 to 1,000,000, particularly preferably 160,000 to 800,000. When the weight average molecular weight is excessively small, the pressure-sensitive adhesive composition tends to exhibit poor holding power, whereas when the weight average molecular weight is excessively large, melt viscosity of the composition tends to increase, making the handling thereof difficult.

Component (a) preferably has a ratio (Mw/Mn) of weight average molecular weight (Mw) to number average molecular weight (Mn) of 2 or less, more preferably 1.5 or less. A small value of the ratio results in production of a pressure-sensitive adhesive composition exhibiting more excellent holding power.

The content of component (a) in the elastomer composition is more than 10 wt. % and less than 47.5 wt. %, preferably 15 to 45 wt. %, more preferably 20 to 40 wt. %. When the content is small, the holding power decreases, whereas when the content is large, the initial bond strength and the peel strength at low temperature considerably decreases.

The aromatic vinyl-isoprene diblock copolymer (b) (hereinafter maybe referred to simply as component (b)) has a single poly(aromatic vinyl) block and a single polyisoprene block.

The poly(aromatic vinyl) block contained in component (b) is similar to the poly(aromatic vinyl) block contained in the aforementioned component (a) in terms of monomer composition, weight average molecular weight, and other properties.

The polyisoprene block contained in component (b) is similar to the polyisoprene block contained in the aforementioned component (a) in terms of monomer composition and other properties.

The aromatic vinyl monomer unit content of component (b) is generally 6 to 75 wt. %, preferably 8 to 50 wt. %, more preferably 10 to 40 wt. %

Component (b) preferably has a weight average molecular weight of 60,000 to 250,000, more preferably 70,000 to 230,000, particularly preferably 80,000 to 220,000. When the weight average molecular weight is excessively small, the pressure-sensitive adhesive composition may exhibit poor holding power, whereas when the weight average molecular weight is excessively large, melt viscosity of the pressure-sensitive adhesive composition tends to increase, making the handling thereof difficult.

Component (b) preferably has a ratio (Mw/Mn) of weight average molecular weight (Mw) to number average molecular weight (Mn) of 2 or less, more preferably 1.5 or less. A small value of the ratio results in production of a pressure-sensitive adhesive composition exhibiting excellent holding power at high temperature.

The content of component (b) in the elastomer composition is more than 47.5 wt. % and less than 85 wt. %, preferably 48 to 75 wt. %, more preferably 50 to 65 wt. %. When the content is small, the initial bond strength and the peel strength considerably decrease at low temperature, whereas when the content is large, the holding power becomes poor.

No particular limitation is imposed on the method for producing component (a), and any conventionally known method may be employed. For example, there may be employed a method including successively polymerizing a poly(aromatic vinyl) block and a polyisoprene block through anionic living polymerization. Alternatively, there may be employed a method including producing individual block copolymers having active terminals which undergo living polymerization (hereinafter referred to as living active terminals) and coupling the block copolymers by use of a coupling agent, to thereby produce a coupled block copolymer.

No particular limitation is imposed on the method for producing component (b), and any conventionally known method may be employed. For example, there may be employed a method including successively polymerizing a poly(aromatic vinyl) block and a polyisoprene block through anionic living polymerization.

The components (a) and (b) may be produced separately in the aforementioned manner. Alternatively, as mentioned below, the components (a) and (b) may be produced as a mixture by a single step anionic living polymerization.

In a first step, an aromatic vinyl monomer was polymerized through anionic living polymerization in a polymerization solvent in the presence of an anionic polymerization initiator, thereby forming a poly(aromatic vinyl) block having a living active terminal. In a second step, isoprene is polymerized from the living active terminal of the poly(aromatic vinyl) block, thereby producing an aromatic vinyl-isoprene diblock copolymer having a living active terminal. In a third step, a portion of the aromatic vinyl-isoprene diblock copolymer having a living active terminal was reacted with a coupling agent, thereby producing a coupled aromatic vinyl-isoprene-aromatic vinyl block copolymer (corresponding to component (a)). In a fourth step, the living active terminal of the rest of the aromatic vinyl-isoprene diblock copolymer having a living active terminal was deactivated by use of a polymerization inhibitor, thereby producing an aromatic vinyl-isoprene diblock copolymer (corresponding to component (b)).

In this way, a mixture of component (a) and component (b) can be produced. Each of the first to fourth steps will next be described in detail in this order.

In the first step, an aromatic vinyl monomer was polymerized in a polymerization solvent in the presence of an anionic polymerization initiator, thereby forming a poly (aromatic vinyl) block having a living active terminal.

No particular limitation is imposed on the polymerization solvent so long as the solvent is inert with respect to the polymerization initiator. For example, a linear-chain hydrocarbon solvent, a cyclic hydrocarbon solvent, or a mixture thereof may be employed. Examples of the linear-chain hydrocarbon solvent include n-butane, isobutane, n-hexane, 1-butene, isobutylene, trans-2-butene, cis-2-butene, 1-pentene, trans-2-pentene, cis-2-pentene, n-pentane, trans-2-pentane, neo-pentane, and a mixture thereof. Examples of the cyclic hydrocarbon solvent include benzene, toluene, xylene, and cyclohexane.

The polymerization solvent is generally used in an amount of 100 to 1,000 parts by weight, preferably 150 to 400 parts by weight, based on the 100 parts by weight of the monomers used.

No particular limitation is imposed on the anionic polymerization initiator, and there may be employed any know initiator which can be used for polymerization of an aromatic vinyl monomer and isoprene. Specific examples include organic monolithium species such as methyllithium, n-propyllithium, n-butyllithium, and sec-butyllithium. Of these, n-butyllithium is preferred. The amount of the polymerization initiator may be appropriately determined such that a polymer having a predetermined weight average molecular weight can be produced through a customary method.

The above polymerization is preferably carried out in the presence of a polar compound, since a polymer having a narrow molecular weight distribution profile can be readily produced by controlling polymerization rate. As the polar compound, an aromatic ether, an aliphatic ether, and a tertiary amine, each having a relative dielectric constant as measured at 25° C. of 2.5 to 5.0, are preferably employed. Examples of such preferred polar compounds include aromatic ethers such as diphenyl ether and anisole; aliphatic ethers such as diethyl ether and dibutyl ether; tertiary monoamines such as trimethylamine, triethylamine, and tripropylamine; and tertiary polyamines such as tetramethylethylenediamine and tetraethylethylenediamine. Among them, tetramethylethylenediamine is preferably used.

The polar compound is preferably used in an amount of 0.005 to 5 mol based on 1 mol of the anionic polymerization initiator, more preferably 0.01 to 2 mol.

In the second step, isoprene is polymerized from the living active terminal of the poly(aromatic vinyl) block, thereby producing an aromatic vinyl-isoprene diblock copolymer having a living active terminal. In this step, isoprene is preferably reacted by adding it in a continuous manner in order to prevent sudden generation of the reaction heat.

In the third step, a portion of the aromatic vinyl-isoprene diblock copolymer having a living active terminal was reacted with a coupling agent, thereby producing a coupled aromatic vinyl-isoprene-aromatic vinyl block copolymer (corresponding to component (a)).

The coupling agent refers to a compound having two or more sites which can be bonded to polymer molecules by the reaction with the living active terminals of the polymer molecules.

Examples of bi-functional coupling agents having two reactive sites include bi-functional halosilanes such as dichlorosilane, monomethyldichlorosilane, and dimethyldichlorosilane; bi-functional alkoxysilanes such as diphenyldimethoxysilane and diphenyldiethoxysilane; bi-functional haloalkanes such as dichloroethane, dibromoethane, methylene chloride, and dibromomethane; and bi-functional tin halides such as dichlorotin, monomethyldichlorotin, dimethyldichlorotin, monoethyldichloroitin, diethyldichlorotin, monobutyldichlorotin, and dibutyldichlorotin; benzoic acid, CO, and 2-chloropropene.

Examples of tri- or more functional coupling agents having three or more reactive sites include tri-functional haloalkanes such as trichloroethane and trichloropropane; tetra-functional halosilane such as tetrachlorosilane and tetrabromosilane; tetra-functional alkoxysilanes such as tetramethoxysilane, tetraethoxysilane, and phenyltrimethoxysilane; and tetra-functional tin compounds such as tetrachlorotin and tetrabromotin.

Of these, bi-functional coupling agents are preferred, with dimethyldichlorosilane being more preferred.

The amount of the coupling agent may be appropriately determined such that the coupled aromatic vinyl-isoprene-aromatic vinyl block copolymer (corresponding to component (a)) is formed in a desired amount.

In the fourth step, the living active terminal of the rest of the aromatic vinyl-isoprene diblock copolymer having a living active terminal was deactivated by use of a polymerization inhibitor, thereby producing an aromatic vinyl-isoprene diblock copolymer (corresponding to component (b)).

Examples of the polymerization inhibitor which can be used include those generally employed in anionic living polymerization. Specific examples include water; alcohols such as methyl alcohol and ethyl alcohol; inorganic acids and organic acids such as hydrochloric acid and acetic acid.

Through the aforementioned method, a solution containing the components (a) and (b) can be produced. An anti-aging agent may be added to the solution in accordance with needs. Subsequently, the formed polymer is separated from the solution through a known polymer separation method such as steam stripping, and the thus-separated polymer is dried, thereby producing a mixture containing the components (a) and (b).

Polyisoprene (c) employed in the present invention (hereinafter may be referred to as "component (c)") contains isoprene as a predominant structural unit. However, component (c) may be a copolymer of isoprene and a monomer which can copolymerize with isoprene (e.g., a conjugated diene monomer other than isoprene), so long as the effect of the present invention is not virtually impaired. Component (c) preferably contains an isoprene unit in an amount of 80 wt. % or more, more preferably 100%. When the isoprene unit content is excessively small, the produced pressure-sensitive adhesive composition may exhibit a poor initial bond strength at low temperature.

Component (c) has a weight average molecular weight of 20,000 to 100,000, preferably 25,000 to 95,000, more preferably 30,000 to 90,000. When the weight average molecular weight is small, the produced pressure-sensitive adhesive composition exhibits poor holding power, whereas when the weight average molecular weight is large, melt viscosity of the elastomer composition and that of the pressure-sensitive adhesive composition increase, making the handling thereof difficult of the compositions.

Component (c) preferably has a ratio (Mw/Mn) of weight average molecular weight (Mw) to number average molecular weight (Mn) of 2 or less, more preferably 1.5 or less. A small value of the ratio results in production of a pressure-sensitive adhesive composition exhibiting excellent holding power at high temperature.

No particular limitation is imposed on the method for producing component (c), and any conventionally known method may be employed. For example, similar to polymerization of the aforementioned aromatic vinyl monomer, there may be employed a method including polymerizing isoprene in a polymerization solvent in the presence of an anionic polymerization initiator.

The content of component (c) in the elastomer composition of the present invention is more than 5 wt. % and less than 20 wt. %, preferably 7 to 18 wt. %, more preferably 8 to 16 wt. %. When the content is small, the initial bond strength and the peel strength at low temperature decrease, whereas when the content is large, the holding power becomes poor.

The elastomer composition of the present invention essentially has an aromatic vinyl monomer unit content of 14 to 50 wt. % based on the total amount of the components (a), (b), and (c). The content preferably falls within a range of 15 to 35 wt. %, more preferably 16 to 25 wt. %. When the content is small, the produced pressure-sensitive adhesive composition exhibits poor holding power, whereas when the content is large, the pressure-sensitive adhesive composition exhibits a poor initial bond strength at low temperature.

No particular limitation is imposed on the method for producing the elastomer composition of the present invention. For example, there may be employed a method including kneading separately obtained or produced components (a), (b), and (c) at predetermined proportions; a method including mixing the components (a), (b), and (c) at predetermined proportions in a solution form, separating the polymer from the solution through a known method, and drying the thus-separated polymer; a method including mixing the components (a) and (b) and kneading the mixture with the separately produced or obtained component (c); or a method including producing a mixture of components (a) and (b) through the aforementioned series of polymerization steps and blending the mixture with component (c).

The elastomer composition of the present invention may contain, in accordance with needs, conventionally known additives such as an anti-aging agent, a UV-absorber, an anti-blocking agent, a filler, and a pigment in a desired amount.

[Pressure-sensitive Adhesive Composition]

The pressure-sensitive adhesive composition of the present invention contains the aforementioned elastomer composition and a tackifier resin.

No particular limitation is imposed on the species of the tackifier resin, and conventionally known natural resin-based and synthetic resin-bases tackifier resins which are used in pressure-sensitive adhesive compositions may be employed.

Examples of natural resin-based tackifier resins include rosin resins and terpene resins. Examples of the rosin resins include rosins such as gum rosin, tall rosin, and wood rosin; modified rosins such as hydrogenated rosin, disproportionated rosin, and polymerized rosin; and rosin esters such as glycerin esters of modified rosin and pentaerythritol esters of modified rosin. Examples of the terpene resins include terpene resins based on α-pinene, β-pinene, or dipentene (limonene); modified aromatic terpene resin; hydrogenated terpene resin; and terpene phenolic resins.

The synthetic resin-bases tackifier resins are generally classified into polymerization-type tackifier resin and condensation-type tackifier resin. Examples of the polymerization-type tackifier resin include petroleum resins such as aliphatic (C5) petroleum resin, aromatic (C9) petroleum resin, copolymer (C5-C9) petroleum resin, hydrogenated petroleum resin, and alicyclic petroleum resin; cumarone-indene resin; and pure monomer petroleum resins such as styrene resin and substituted styrene resin. Examples of the condensation-type tackifier resin include phenolic resins such as alkylphenol resin and rosin-modified phenolic resin; and xylene resins. These tackifier resins may be used singly or in combination of two or more species. Of these, petroleum resins are preferably used.

The pressure-sensitive adhesive composition of the present invention contains the tackifier resin in an amount of 10 to 500 parts by weight, preferably 50 to 350 parts by weight, more preferably 70 to 250 parts by weight, based on 100 parts by weight of the elastomer composition.

The pressure-sensitive adhesive composition of the present invention may contain, in accordance with needs, other agents such as a rubber component, a softening agent, an antioxidant, a heat-stabilizer, a UV-absorber, and a filler.

Examples of the rubber component include styrene block copolymers such as styrene-butadiene-styrene block copolymer, styrene-(ethylene-butylene)-styrene block copolymer, styrene-(ethylene-propylene)-styrene block copolymer; and diene rubbers such as styrene-butadiene rubber, butadiene rubber, isoprene rubber, and natural rubber. These rubber components may be used in combination of two or more species. No particular limitation is imposed on the amount of the rubber component, and the amount may be determined in accordance with characteristics of interest required for the pressure-sensitive adhesive composition.

Softening agents that are conventionally employed in pressure-sensitive adhesive compositions may also be used in the present invention. Examples of the softening agent include extender oiles such as aromatic process oil, paraffin process oil, and naphthene process oil; and liquid polymers such as polybutene and polyisobutylene. Of these, extender oiles such as paraffin process oil and naphthene process oil are preferred. These softening agents may be used in combination of two or more species.

The elastomer composition of the present invention preferably employs the softening agent in an amount of 10 to 500 parts by weight, more preferably 20 to 300 parts by weight, particularly preferably 30 to 150 parts by weight, based on 100 parts by weight of the elastomer composition. When the amount of the softening agent is excessively small, viscosity of the pressure-sensitive adhesive composition tends to increase, making the handling thereof difficult of the composition, whereas when the amount is excessively large, the softening agent tends to bleed.

Examples of the anitoxidant include hindered phenol compounds such as 2,6-di-tert-butyl-p-cresol, pentaerythrityl tetrakis [3-(3,5-di-tert-butyl-4-hydroxyphenyl)propionate], 2,4-bis(n-octylthio)-6-(4-hydroxy-3,5-di-tert-butylanilino)-1,3,5-triazine; thiodicarboxylate esters such as dilauryl thiodipropionate; and phosphites such as tris(nonylphenyl) phosphite and 4,4'-butylidene-bis(3-methyl-6-tert-butylphenyl) ditridecyl phosphite. These antioxidants may be used in combination of two or more species. The amount of each antioxidant to be employed may be appropriately determined in accordance with the characteristics of the used antioxidant and with characteristics of the target pressure-sensitive adhesive composition.

No particular limitation is imposed on the method for producing the pressure-sensitive adhesive composition of the present invention, and conventionally known methods may be employed. For example, there may be employed a method including melt-kneading the components under nitrogen at a temperature as high as about 160 to 180° C.

The pressure-sensitive adhesive composition of the present invention is generally used as coating applied to a backing support.

No particular limitation is imposed on the material of the backing support. Examples of the backing support include papers such as kraft paper, Japanese paper, quality paper, and synthetic paper; cloths such as cotton cloth, staple fiber cloth, and polyester cloth; resin films such as cellophane film, poly(vinyl chloride) film, polyester film, polypropylene film, and polyethylene film; metal foils such as aluminum foil and copper foil; and non-woven fabrics such as polyester non-woven fabric and rayon non-woven fabric.

The backing support, in advance, may undergo corona discharge surface treatment or be coated with a primary coating material.

No particular limitation is imposed on the coating method, and conventionally coating methods may be employed. For example, there may be employed a method including dissolving the pressure-sensitive adhesive composition in an organic solvent and applying the solution; a method including heat-melting the pressure-sensitive adhesive composition and directly applying the melt; and a method including dispersing the pressure-sensitive adhesive composition in water by use of an emulsifier and applying the prepared emulsion. Among these methods, the method including heat-melting the pressure-sensitive adhesive composition and directly applying the melt is preferred.

Examples of the organic solvent for dissolving the pressure-sensitive adhesive composition include aliphatic hydrocarbons such as n-hexane and cyclohexane; aromatic hydrocarbons such as benzene, toluene, and xylene; and halogenized compounds thereof.

By virtue of excellent pressure-sensitive adhesion performance in a wide temperature range, the pressure-sensitive adhesive composition of the present invention can be employed for producing pressure-sensitive adhesive tape such as packing tape, office use tape, double coated tape, masking tape, and electrical insulation tape; pressure-sensitive adhesive sheets and labels; and roller dusters.

EXAMPLES

The present invention will next be described in more detail by way of Examples. Unless otherwise specified, the units "part(s)" and "%" shown in the Examples are on the basis of weight.

The weight average molecular weight of each polymer was determined, as a polystyrene-basis value, through high performance liquid gel permeation chromatography using tetrahydrofuran as a carrier.

The ratio of component (a) to component (b) was determined from the peak areas of these components which were recorded through high performance liquid gel permeation chromatography.

The chemical composition of each copolymer was determined through $^1$H-NMR.

The peel strength (N/m) at ambient temperature was determined at 23° C. by use of a stainless steel sheet serving as an adherent in accordance with PSTC-1 (a 180° peel strength test prescribed by the American Pressure Sensitive Tape Committee).

The loop tack (N/m) was determined at 23° C. and 5° C. by use of a polyethylene sheet serving as an adherent in accordance with FINAT-1991 FTM-9 (Quick-stick tack measurement). The loop tack value serves as an index for peel strength, and the more the loop tack value, the more excellent the peel strength.

The rolling ball tack (mm) was determined at 23° C. and 5° C. according to PSTC-6 (an initial bond strength test prescribed by the American Pressure Sensitive Tape Committee). The smaller the rolling ball tack value, the higher the initial bond strength.

The holding power at high temperature was determined by use of a test piece of pressure-sensitive adhesive tape having a width of 10 mm, and a stainless steel sheet serving as an adherent in accordance with PSTC-6 (a holding power test prescribed by the American Pressure Sensitive Tape Committee). The test piece was caused to adhere to a stainless steel sheet so as to provide a bonded area of 10 mm×25 mm. The time to cause peeling (min) by a load of $3.92 \times 10^4$ Pa at 50° C. was measured. The more the load value, the higher the holding power.

Referential Example 1

To a pressure reactor, cyclohexane (112 parts) N,N,N',N'-tetramethylethylenediamine (hereinafter abbreviated as "TMEDA") (0.00049 parts) and styrene (9.6 parts) were placed. n-Butyllithium (0.0181 parts) serving as a polymerization initiator was added to the mixture while the mixture was stirred at 40° C. The content was heated to 50° C. and stirred for one hour, thereby causing polymerization. At this stage, polymerization conversion of styrene was found to be 100%. A portion of the thus-obtained reaction mixture was sampled, and analyzed through gel permeation chromatography, thereby determining the weight average molecular weight of a polystyrene block. Table 1 shows the results.

Subsequently, isoprene (38.4 parts) was added to the aforementioned pressure reactor over one hour while the temperature of the reactor was controlled so as to regulate the temperature of the content to 50° C. to 60° C. After completion of addition, the reaction mixture was further stirred for one hour, thereby causing polymerization. At this stage, polymerization conversion of isoprene was found to be 100%. A portion of the thus-obtained reaction mixture was sampled, and analyzed through gel permeation chromatography, thereby determining the weight average molecular weight of a styrene-isoprene diblock copolymer (corresponding to component (b)). Table 1 shows the results.

Subsequently, dimethyldichlorosilane (0.0073 parts) serving as a coupling agent was added to the aforementioned pressure reactor, and the mixture was stirred for two hours, thereby causing coupling reaction, whereby a styrene-isoprene-styrene triblock copolymer (corresponding to component (a)) was formed. Thereafter, methanol (0.0271 parts) serving as a polymerization inhibitor was added to the aforementioned pressure reactor, and the mixture was sufficiently mixed so as to stop polymerization, thereby yielding aromatic vinyl-isoprene block copolymer composition I formed of components (a) and (b) (represented by Component (a)+(b) in Table 1). A portion of the thus-obtained reaction mixture was sampled, and the styrene unit content of the aforementioned composition I was determined. The weight average molecular weight of component (a) and the weight ratio of component (a) or (b) to the entire composition were determined through gel permeation chromatography. The results are shown in Table 1.

Referential Examples 2 through 6

The procedure of Referential Example 1 was repeated, except that the amounts of TMEDA, n-butyllithium, styrene, isoprene, dimethyldichlorosilane, and methanol employed were changed to those shown in Table 1, to thereby yield aromatic vinyl-isoprene block copolymer compositions II through VI each formed of components (a) and (b). The results are shown in Table 1.

Referential Example 7

To a pressure reactor, cyclohexane (112 parts) TMEDA (0.0022 parts), and n-butyllithium (0.081 parts) were placed. Isoprene (48 parts) was added to the mixture over one hour while the mixture was stirred at 40° C. and the polymerization temperature was elevated to 60° C. After completion of addition of isoprene, the reaction mixture was caused to further polymerize at 60° C. for one hour. Polymerization conversion of isoprene was found to be 100%. Thereafter, methanol (0.121 parts) serving as a polymerization inhibitor was added to the aforementioned pressure reactor, and the mixture was sufficiently mixed, thereby yielding polyisoprene i (corresponding component (c)). The polyisoprene i was found to have a weight average molecular weight of 70,000.

Referential Example 8

The procedure of Referential Example 7 was repeated, except that the amount of TMEDA, that of n-butyllithium, and that of methanol were changed to 0.0036 parts, 0.133 parts, and 0.2 parts, respectively, to thereby yield polyisoprene ii. The polyisoprene ii was found to have a weight average molecular weight of 40,000.

Example 1

To a solution (85 parts by weight) of the aromatic vinyl-isoprene block copolymer composition I dissolved in cyclohexane so as to have a concentration of 30%, a solution (15 parts by weight) of polyisoprene i dissolved in cyclohexane so as to have a concentration of 30% was added. 2,6-Di-tert-butyl-p-cresol (0.3 parts) serving as an antioxidant was added to the above system, and mixed. Aliquots of the thus-yield solution were added dropwise to hot water heated at 85 to 95° C., thereby vaporizing solvent. The deposited matter was pulverized and dried at 85° C. by hot air, to thereby yield an elastomer composition. The composition of the elastomer composition is shown in Table 2.

The elastomer composition (100 parts by weight) was fed to a kneader equipped with stirring paddles, and to the composition added a tackifier resin (aliphatic petroleum resin, Quintone M100, product of Zeon Corporation) (100 parts by weight), a softening agent (naphthene process oil, Shellflex 371, product of Shell Chemicals Ltd.) (20 parts by weight), and an antioxidant (Irganox 1010, product of Chiba Specialty Chemicals Inc.) (1 part). The interior of the kneader was purged with nitrogen, and the mixture was kneaded at 160 to 180° C., thereby preparing a pressure-sensitive adhesive composition. The thus-yielded pressure-sensitive adhesive composition was applied to polyester film (thickness: 25 μm) so as to have a coating thickness of 25 μm, to thereby produce a pressure-sensitive adhesive sheet. The thus-obtained pressure-sensitive adhesive sheet was evaluated in terms of pressure-sensitive adhesion performance. The results are shown in Table 2.

Examples 2 and 3 and Comparative Examples 1 through 3

Each elastomer composition was prepared in accordance with the composition shown in Table 2. The corresponding

TABLE 1

| | Referential Examples | | | | | |
|---|---|---|---|---|---|---|
| | 1 | 2 | 3 | 4 | 5 | 6 |
| Component (a) + (b) | I | II | III | IV | V | VI |
| Polymerization formulation (parts) | | | | | | |
| TMEDA ($\times 10^{-3}$) | 0.49 | 0.51 | 0.54 | 1.18 | 0.37 | 0.72 |
| n-Butyllithium ($\times 10^{-3}$) | 18.1 | 18.7 | 19.8 | 43.4 | 13.6 | 26.4 |
| Styrene | 9.6 | 10.7 | 9.1 | 11.3 | 12.2 | 8.2 |
| Isoprene | 38.4 | 37.3 | 38.9 | 36.7 | 35.8 | 39.8 |
| Dimethyldichlorosilane ($\times 10^{-3}$) | 7.3 | 5.2 | 7.7 | 39.1 | 3.9 | 11.7 |
| Methanol ($\times 10^{-3}$) | 27.1 | 28.1 | 29.7 | 65.1 | 20.3 | 39.5 |
| Entire composition | | | | | | |
| Styrene unit content (%) | 20.0 | 22.2 | 18.9 | 23.5 | 25.4 | 17.0 |
| Component (a) | | | | | | |
| Wt. av. mol. wt. ($\times 10^3$) | 418 | 424 | 387 | 212 | 506 | 329 |
| Wt. av. mol. wt. of polystyrene block ($\times 10^3$) | 37.9 | 41.2 | 33.1 | 22.9 | 59.1 | 23.6 |
| Content (%) | 40.0 | 27.8 | 44.4 | 89.4 | 28.4 | 44.0 |
| Component (b) | | | | | | |
| Wt. av. mol. wt. ($\times 10^3$) | 220 | 214 | 204 | 112 | 267 | 162 |
| Wt. av. mol. wt. of polystyrene block ($\times 10^3$) | 37.9 | 41.2 | 33.1 | 22.9 | 59.1 | 23.6 |
| Content (%) | 60.0 | 72.2 | 55.6 | 10.6 | 71.6 | 56.0 | pressure-sensitive adhesive composition was prepared in a manner similar to that employed in Example 1, and pressure-sensitive adhesion performance was tested. The results are shown in Table 2.

TABLE 2

|  | Examples | | | Referential Examples | | |
|---|---|---|---|---|---|---|
|  | 1 | 2 | 3 | 1 | 2 | 3 |
| Elastomer compositions | | | | | | |
| Styrene unit content (%) | 17 | 20 | 17 | 20 | 17 | 17 |
| Component (a) + (b) | I | II | III | IV | V | VI |
| Content (%) | 85 | 90 | 90 | 85 | 67 | 100 |
| Component (a) | | | | | | |
| Wt. av. mol. wt. (×10³) | 418 | 424 | 387 | 212 | 506 | 329 |
| Content (%) | 34 | 25 | 40 | 76 | 19 | 44 |
| Component (b) | | | | | | |
| Wt. av. mol. wt. (×10³) | 220 | 214 | 204 | 112 | 267 | 162 |
| Content (%) | 51 | 65 | 50 | 9 | 48 | 56 |
| Component (c) | i | i | ii | ii | i | — |
| Wt. av. mol. wt. (×10³) | 70 | 70 | 40 | 40 | 70 | — |
| Content (%) | 15 | 10 | 10 | 15 | 33 | — |
| Physical properties of pressure-sensitive adhesive compositions | | | | | | |
| Peel strength: 23° C. (N/m) | 1780 | 1850 | 1700 | 1120 | 1200 | 930 |
| Loop tack: 23° C. (N/m) | 870 | 880 | 840 | 880 | 610 | 630 |
| Loop tack: 5° C. (N/m) | 730 | 820 | 780 | 510 | 560 | 470 |
| Rolling ball tack: 23° C. (mm) | 45 | 50 | 35 | 40 | 45 | 90 |
| Rolling ball tack: 5° C. (mm) | 50 | 55 | 40 | 200 | 40 | 250< |
| Holding power (min) | 620 | 480 | 560 | 740 | 15 | 600 |

The results shown in Table 2 indicated the following.

The pressure-sensitive adhesive composition of Comparative Example 1 formed from an elastomer composition containing component (b) in an amount less than 47.5 wt. % exhibited excellent holding power, but exhibited poor peel strength at ambient temperature. In addition, the composition is considerably deteriorated in terms of peel strength at low temperature and initial bond strength at low temperature.

The pressure-sensitive adhesive composition of Comparative Example 2 employing an elastomer composition having a component (c) content in excess of 20 wt. % exhibited poor peel strength at ambient temperature and holding power.

The pressure-sensitive adhesive composition of Comparative Example 3 employing an elastomer composition containing no component (c) exhibited poor peel strength at ambient temperature. In addition, the composition is considerably deteriorated in terms of peel strength at low temperature and initial bond strength at low temperature.

In contrast to these pressure-sensitive adhesive compositions of Comparative Examples, the pressure-sensitive adhesive compositions of Examples 1 to 3 according to the present invention exhibited excellent initial bond strength, peel strength, and holding power, and, at low temperature, exhibits minimal drop in initial bond strength and peel strength.

INDUSTRIAL APPLICABILITY

The present invention provides a pressure-sensitive adhesive composition which exhibits excellent initial bond strength, peel strength, and holding power, and, even at relatively low temperature, exhibits minimal drop in initial bond strength and peel strength, and an elastomer composition suitable for providing the pressure-sensitive adhesive composition.

The invention claimed is:

1. An elastomer composition comprising
an aromatic vinyl-isoprene block copolymer (a) having two or more poly(aromatic vinyl) blocks, in an amount more than 10 wt. % and less than 47.5 wt. %;
an aromatic vinyl-isoprene diblock copolymer (b) in an amount more than 47.5 wt. % and less than 85 wt. %; and
polyisoprene (c) having a weight average molecular weight of 20,000 to 100,000, in an amount more than 5 wt. % and less than 20 wt. %,
wherein the composition has an aromatic vinyl monomer unit content more than 14 wt. % and less than 50 wt. %, based on the total amount of the components (a), (b), and (c).

2. The elastomer composition according to claim 1, wherein a content of an aromatic vinyl monomer unit in the aromatic vinyl-isoprene block copolymer (a) is 15 to 75 wt. %.

3. The elastomer composition according to claim 1, wherein a weight average molecular weight of each poly(aromatic vinyl) block in the aromatic vinyl-isoprene block copolymer (a) is 5,000 to 100,000.

4. The elastomer composition according to claim 1, wherein a weight average molecular weight of the aromatic vinyl-isoprene block copolymer (a) is 120,000 to 1,200,000.

5. The elastomer composition according to claim 1, wherein a content of an aromatic vinyl monomer unit in the aromatic vinyl-isoprene diblock copolymer (b) is 6 to 75 wt. %.

6. The elastomer composition according to claim 1, wherein a weight average molecular weight of a poly(aromatic vinyl) block in the aromatic vinyl-isoprene diblock copolymer (b) is 5,000 to 100,000.

7. The elastomer composition according to claim 1, wherein a weight average molecular weight of the aromatic vinyl-isoprene diblock copolymer (b) is 60,000 to 250,000.

8. The elastomer composition according to claim 1, wherein the aromatic vinyl-isoprene block copolymer (a) is an aromatic vinyl-isoprene-aromatic vinyl triblock copolymer.

9. The elastomer composition according to claim 1, wherein the aromatic vinyl monomer is styrene.

10. The elastomer composition according to claim 1, which contains an aromatic vinyl-isoprene block copolymer (a) in an amount of 15 to 45 wt. %, an aromatic vinyl-isoprene diblock copolymer (b) in an amount of 48 to 75 wt. %, and polyisoprene (c) in an amount of 7 to 18 wt. %.

11. The elastomer composition according to claim 1, which has an aromatic vinyl monomer unit content of 15 to 35 wt. % based on the total amount of the components (a), (b), and (c).

12. A pressure-sensitive adhesive composition comprising the elastomer composition as described in claim 1 and a tackifier resin.

13. The pressure-sensitive adhesive composition according to claim 12, wherein a content of the tackifier resin is 10 to 500 parts by weight based on 100 parts by weight of the elastomer composition.

* * * * *